(12) United States Patent
Sagane

(10) Patent No.: US 9,539,857 B2
(45) Date of Patent: Jan. 10, 2017

(54) SADDLE RIDING TYPE VEHICLE

(71) Applicant: YAMAHA HATSUDOKI KABUSHIKI KAISHA, Iwata-shi, Shizuoka-ken (JP)

(72) Inventor: Kazunari Sagane, Iwata (JP)

(73) Assignee: YAMAHA HATSUDOKI KABUSHIKI KAISHA, Iwata-shi, Shizuoka-ken (JP)

(*) Notice: Subject to any disclaimer, the term of this patent is extended or adjusted under 35 U.S.C. 154(b) by 22 days.

(21) Appl. No.: 14/669,938

(22) Filed: Mar. 26, 2015

(65) Prior Publication Data

US 2015/0290971 A1 Oct. 15, 2015

(30) Foreign Application Priority Data

Apr. 10, 2014 (JP) ................ 2014-081163

(51) Int. Cl.
*B60B 27/02* (2006.01)
*B60B 27/00* (2006.01)
*F16C 33/78* (2006.01)
*F16C 35/067* (2006.01)
*F16C 41/00* (2006.01)
*F16C 19/06* (2006.01)

(52) U.S. Cl.
CPC ....... *B60B 27/0068* (2013.01); *B60B 27/0005* (2013.01); *B60B 27/0073* (2013.01); *B60B 27/02* (2013.01); *F16C 33/7886* (2013.01); *F16C 35/067* (2013.01); *B60B 2900/111* (2013.01); *B60B 2900/113* (2013.01); *F16C 19/06* (2013.01); *F16C 33/7896* (2013.01); *F16C 41/007* (2013.01); *F16C 2326/02* (2013.01)

(58) Field of Classification Search
CPC ............................ B60B 27/0068; G01P 3/487
USPC .................... 324/173, 174; 301/110.5, 110.6
See application file for complete search history.

(56) References Cited

U.S. PATENT DOCUMENTS

| | | | | |
|---|---|---|---|---|
| 5,326,157 A * | 7/1994 | Nagano | ................. | B62K 25/02 301/110.5 |
| 5,880,585 A * | 3/1999 | Oguro | .................... | G01D 5/145 324/174 |
| 6,492,805 B1 * | 12/2002 | Wakabayashi | .......... | B60T 1/065 324/160 |

(Continued)

FOREIGN PATENT DOCUMENTS

| | | |
|---|---|---|
| JP | H07-17609 U | 3/1995 |
| JP | 2002-079974 A | 3/2002 |

(Continued)

OTHER PUBLICATIONS

Extended European Search Report dated Jul. 27, 2015.

*Primary Examiner* — Jeffrey J Restifo
(74) *Attorney, Agent, or Firm* — Rabin & Berdo, P.C.

(57) ABSTRACT

A saddle riding type vehicle driven by a straddling rider, comprises a wheel including a wheel member having an annular rim, and a hub formed centrally of the rim to have a through hole formed at a center of rotation, a bearing attached to an inner circumferential surface of the through hole, and a tire attached to the rim; a wheel support for rotatably supporting the wheel with an axle inserted in the through hole; a sensor rotor mounted on the hub using the inner circumferential surface of the through hole as reference; and a wheel speed sensor for detecting rotation of the sensor rotor.

13 Claims, 5 Drawing Sheets

(56) References Cited

U.S. PATENT DOCUMENTS

| | | | | |
|---|---|---|---|---|
| 7,322,437 | B2* | 1/2008 | Toyoda | B62J 99/00 180/219 |
| 7,628,518 | B2* | 12/2009 | Fujii | B62J 6/001 301/110.5 |
| 7,901,013 | B2* | 3/2011 | Ishida | B60T 8/171 303/137 |
| 8,253,412 | B2* | 8/2012 | Iwahashi | G01P 1/04 324/174 |
| 8,302,982 | B2* | 11/2012 | Bastianen | B62K 25/02 280/281.1 |
| 9,145,028 | B2* | 9/2015 | Mori | B60T 8/1706 |
| 2002/0190711 | A1* | 12/2002 | Oguro | B62J 99/00 324/207.25 |
| 2005/0247499 | A1* | 11/2005 | Toyoda | B62J 99/00 180/219 |
| 2006/0066294 | A1* | 3/2006 | Ishida | B60T 8/3225 324/166 |
| 2006/0202553 | A1* | 9/2006 | Nimura | B60T 8/1706 303/168 |
| 2007/0211974 | A1 | 9/2007 | Toth et al. | |
| 2008/0084202 | A1* | 4/2008 | Shing | G01P 1/04 324/174 |
| 2008/0110706 | A1* | 5/2008 | Ishida | B60T 8/171 188/181 R |
| 2009/0051349 | A1* | 2/2009 | Fruehling | F16C 33/7859 324/173 |
| 2009/0183957 | A1* | 7/2009 | Ishida | B60T 8/329 188/181 R |
| 2011/0210719 | A1* | 9/2011 | Ishida | B60T 8/329 324/174 |
| 2011/0253469 | A1* | 10/2011 | Landrieve | B60B 27/02 180/219 |
| 2012/0200145 | A1* | 8/2012 | Kakuda | B60B 3/001 301/109 |
| 2013/0026731 | A1* | 1/2013 | Mikura | B60B 27/0068 280/279 |
| 2014/0165726 | A1* | 6/2014 | Boro | G01P 3/487 73/514.39 |
| 2014/0175857 | A1* | 6/2014 | Mori | B60T 8/1706 301/6.8 |

FOREIGN PATENT DOCUMENTS

| | | |
|---|---|---|
| JP | 2007-178254 A | 7/2007 |
| JP | 2009-255826 A | 11/2009 |

* cited by examiner

SADDLE RIDING TYPE VEHICLE

CROSS-REFERENCE TO RELATED APPLICATION

This application is based on, and claims priority to, Japanese Patent Application No. 2014-081163, filed on Apr. 10, 2014, the contents of which are incorporated herein by reference.

BACKGROUND OF THE INVENTION (1) Field of the Invention

This invention relates to a saddle riding type vehicle driven by a rider straddling the vehicle, and more particularly to a mounting structure which mounts a sensor rotor for detecting wheel speed on a wheel member.

(2) Description of the Related Art

A conventional saddle riding type vehicle of this type includes a main frame, a wheel support, a sensor rotor and a wheel speed sensor (see Japanese Utility Model Publication No. H7-17609 (FIGS. 5 and 6), Japanese Unexamined Patent Publication No. 2002-79974 (FIGS. 3-5) and Japanese Unexamined Patent Publication No. 2009-255826 (FIGS. 3, 7 and 8), for example).

The sensor rotor is mounted on the front wheel, for example. The front wheel is rotatably attached to a lower portion of the wheel support which is attached to a front portion of the main frame. The sensor rotor has an annular shape, and is mounted to have an inner circumferential surface thereof located on an outer circumferential surface of a hub with an axle inserted therein. The wheel speed sensor detects outer peripheries of the sensor rotor, and outputs a signal corresponding to a rotating speed of the front wheel.

Since a wheel member on which the front wheel is mounted is generally manufactured by casting, the outer circumferential surface of the hub is rough. Therefore, in order to attach the sensor rotor on the wheel member with increased accuracy of coaxiality between the sensor rotor and the axle, the wheel member is processed to increase the accuracy of coaxially at the outer circumferential surface of the hub.

However, the conventional example with such construction has the following problems.

The conventional apparatus, which requires the outer circumferential surface of the hub of the wheel member to be processed to improve its coaxiality, has a problem of high cost due to an additional cost of the process. Since the sensor rotor is mounted on the outer circumferential surface of the hub, the sensor rotor has a large diameter. This poses a problem of an increase in the weight of the sensor rotor. Further, because of the large diameter of the sensor rotor, a stay having an increased length is required for attaching the wheel speed sensor, which poses a problem of lowered strength.

SUMMARY OF THE INVENTION

This invention has been made having regard to the state of the art noted above, and its object is to provide a saddle riding type vehicle in which a mounting structure for a sensor rotor is devised to achieve reductions in cost and weight of a wheel having the sensor rotor, and improve strength.

To fulfill the above object, this invention provides the following construction.

A saddle riding type vehicle driven by a straddling rider, according to this invention, comprises a wheel including a wheel member having an annular rim, and a hub formed centrally of the rim to have a through hole formed at a center of rotation, a bearing attached to an inner circumferential surface of the through hole, and a tire attached to the rim; a wheel support for rotatably supporting the wheel with an axle inserted in the through hole; a sensor rotor mounted on the hub using the inner circumferential surface of the through hole as reference; and a wheel speed sensor for detecting rotation of the sensor rotor.

According to this invention, since it is necessary to ensure a high degree of rotation accuracy of the wheel by the bearing and axle, the through hole formed at the center of rotation of the hub is processed to have a highly accurate coaxiality with respect to the center of rotation. Therefore, by mounting the sensor rotor using the inner circumferential surface of this through hole as reference, the sensor rotor can be mounted with a high degree of coaxiality without processing the outer circumferential surface of the hub. This can curb processing cost to reduce the cost of the wheel. Since the reference for mounting the sensor rotor can be set close to the center of rotation, the sensor rotor can be reduced in diameter. This can attain a weight saving of the wheel. Since the diameter of the sensor rotor can be small, a stay to which the wheel speed sensor is attached can be reduced in length and improved in strength.

In this invention, it is preferred that the vehicle further comprises a spacer including a projection projecting toward the hub, and a mount portion projecting in a direction away from the projection, the spacer being attached with an outer circumferential surface of the projection positionally adjusted to the inner circumferential surface of the through hole; wherein the sensor rotor has an annular outward appearance, and is mounted with an inner circumferential surface thereof positionally adjusted to an outer circumferential surface of the mount portion.

The projection of the spacer is mounted in the through hole, and the sensor rotor is mounted on the mount portion of the spacer, which can realize the high degree of coaxiality with ease. These components can be mounted with high coaxiality even where they are not directly mounted because of a relationship between materials forming the wheel member and the sensor rotor.

In this invention, it is preferred that the through hole has a dust seal disposed between an inner circumferential surface of the spacer and an outer lateral surface of the bearing. The dust seal can prevent entry of dust to the bearing.

In this invention, it is preferred that the wheel member is formed of a magnesium alloy, the sensor rotor is formed of iron, and the spacer is formed of an aluminum alloy.

An interaction between the wheel member formed of a magnesium alloy and the sensor rotor formed of iron tends to cause corrosion of the wheel member formed of a magnesium alloy. Such corrosion can be prevented by interposing the spacer in between.

In this invention, it is preferred that the sensor rotor has an annular outward appearance, has an engaging portion formed of an inner circumferential region thereof projecting toward the hub, and is mounted with an outer circumferential surface of the engaging portion positionally adjusted to the inner circumferential surface of the through hole.

Since the sensor rotor is mounted with the outer circumferential surface of its engaging portion positionally adjusted to the inner circumferential surface of the through hole, the sensor rotor can be mounted easily with a high degree of coaxiality, without necessitating an additional interposing component.

In this invention, it is preferred that the through hole has a dust seal disposed between an inner circumferential surface of the engaging portion and an outer lateral surface of the bearing. The dust seal can prevent entry of dust to the bearing.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of this invention will be described in detail hereinafter with reference to the drawings. The embodiments will be described taking a two-wheeled motor vehicle as an example of saddle riding type vehicle.

<Embodiment 1>

Embodiment 1 of this invention will be described hereinafter with reference to the drawings.

Figure 1:
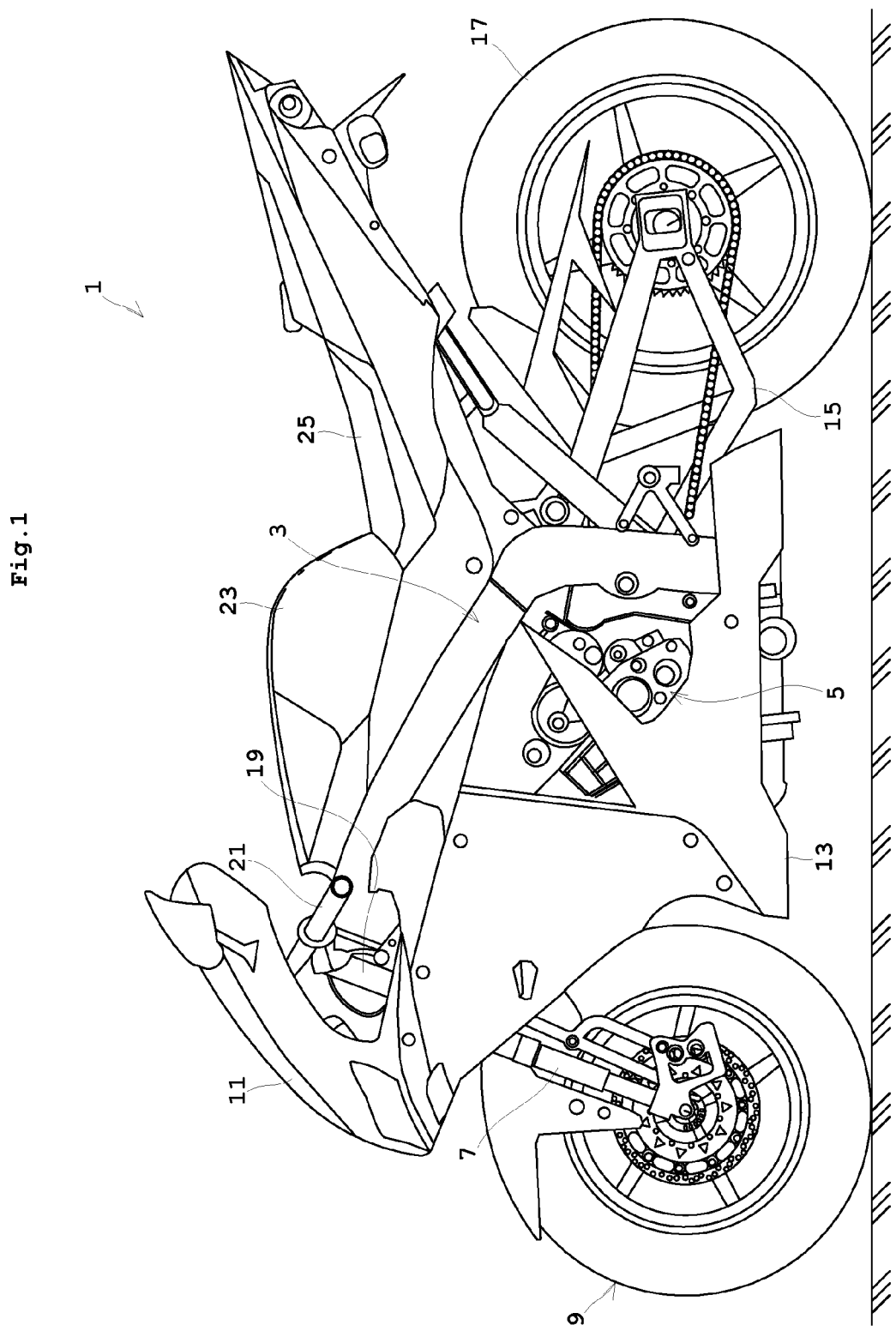
FIG. 1 is the side view showing an entire construction of a two-wheeled motor vehicle according to Embodiment 1.

FIG. 1 is a side view showing an entire construction of a two-wheeled motor vehicle according to Embodiment 1. The terms front, rear, right and left used in the following description refer to the directions as seen from the rider mounted on the vehicle.

The two-wheeled motor vehicle 1 includes a body frame 3, an engine 5, front forks 7, a front wheel 9, an upper cowl 11, an under cowl 13, a swing arm 15 and a rear wheel 17.

The body frame 3 forms a framework of the two-wheeled motor vehicle 1, and carries the engine 5 for generating drive. The body frame 3 also has a head tube 19 disposed forward. The head tube 19 has the front forks 7 swivelably attached thereto, and the front forks 7 have a steering handle 21 at a top end thereof. The front forks 7 have the front wheel 9 attached to bottom ends thereof to be rotatable about a horizontal axis. The front wheel 9 is attached to be swivelable with the steering handle 21 and front forks 7.

The upper cowl 11 is attached to the body frame 3 to overlap an area forward of the head tube 19 and an upper forward portion of the engine 5 as seen from a side of the vehicle. The upper cowl 11 straightens air flows coming in from the front, and efficiently guides the air to the engine 5. The under cowl 13 is connected to a lower portion of the upper cowl 11 and is attached to overlap a lower portion of the engine 5 as seen from a side of the vehicle. The under cowl 13 straightens air flows coming in from the front, and efficiently guides the air to the engine 5 in combination with the upper cowl 11. The swing arm 15 is swingably attached at one end thereof to the rear of the body frame 3. The swing arm 15 has the rear wheel 17 attached to the other end thereof to be rotatable about a horizontal axis.

The body frame 3 has a fuel tank 23 mounted in a position thereof above the engine 5. A seat 25 for seating the rider is mounted on the body frame 3 rearward of the fuel tank 23.

The front forks 7 noted above correspond to the "wheel support" in this invention.

Figure 2:
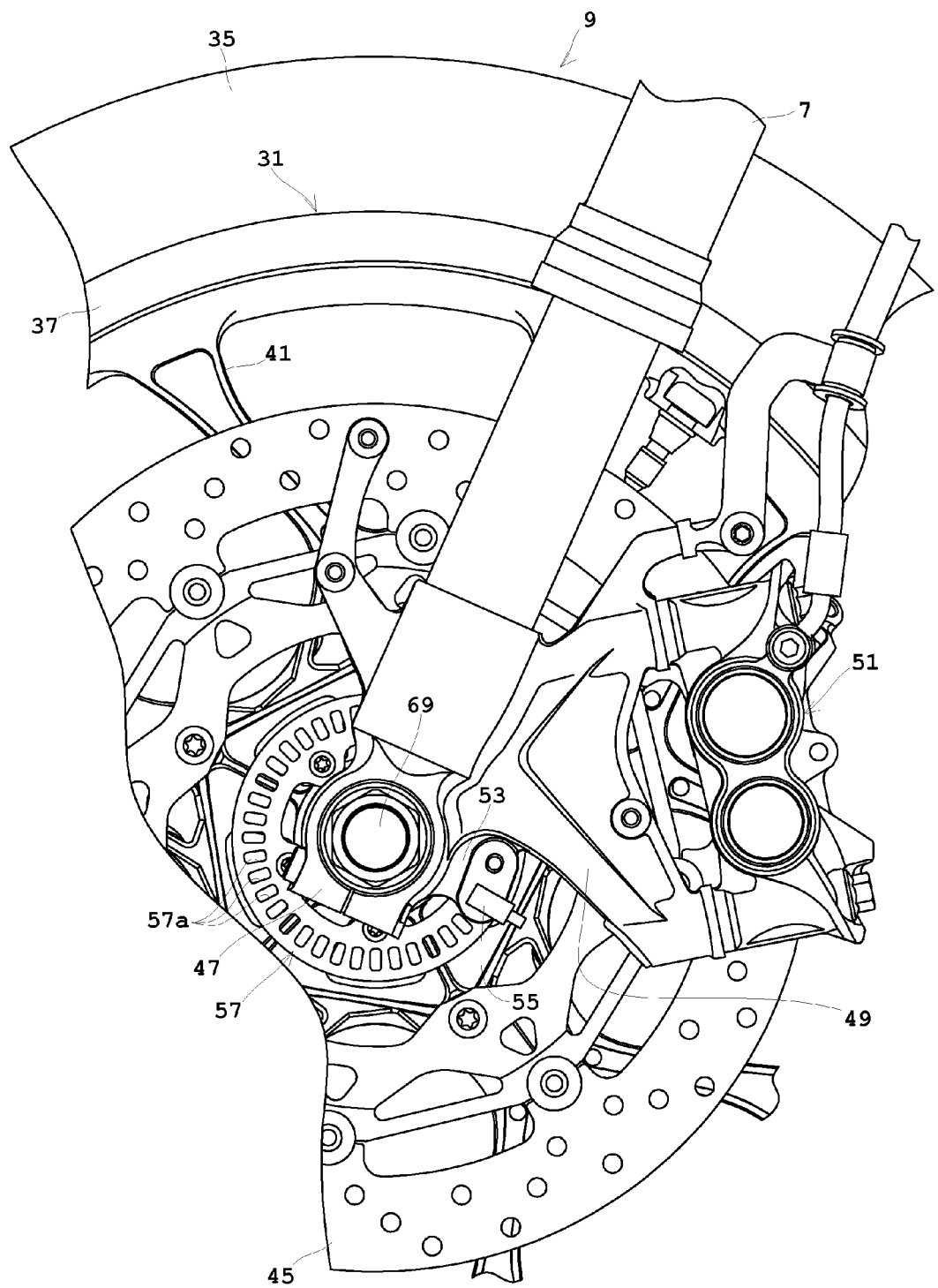
FIG. 2 is an enlarged side view of a portion around the center of a front wheel.
Figure 3:
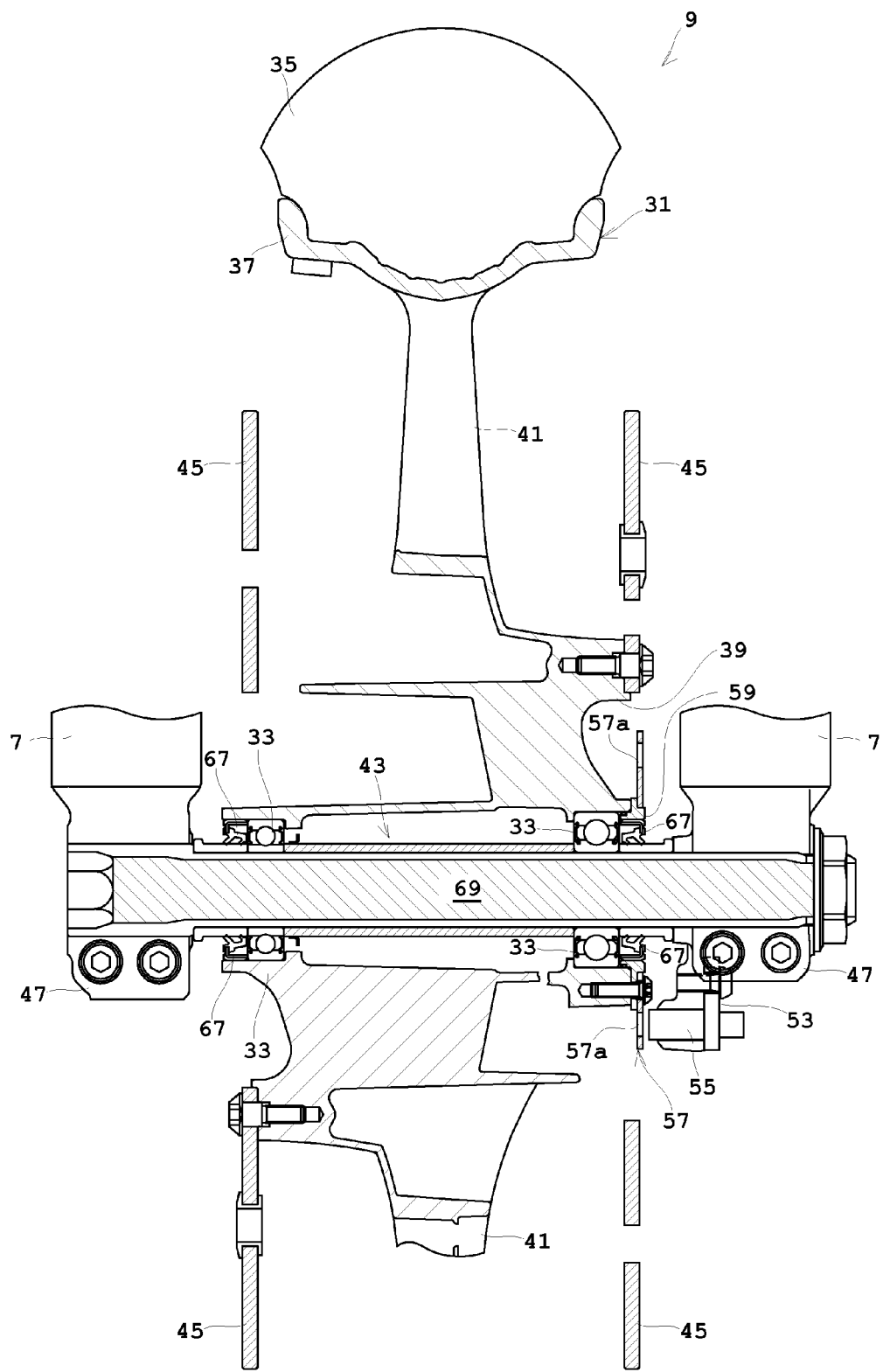
FIG. 3 is a view in vertical section taken in a transverse direction passing through a hub of the front wheel.
Figure 4:
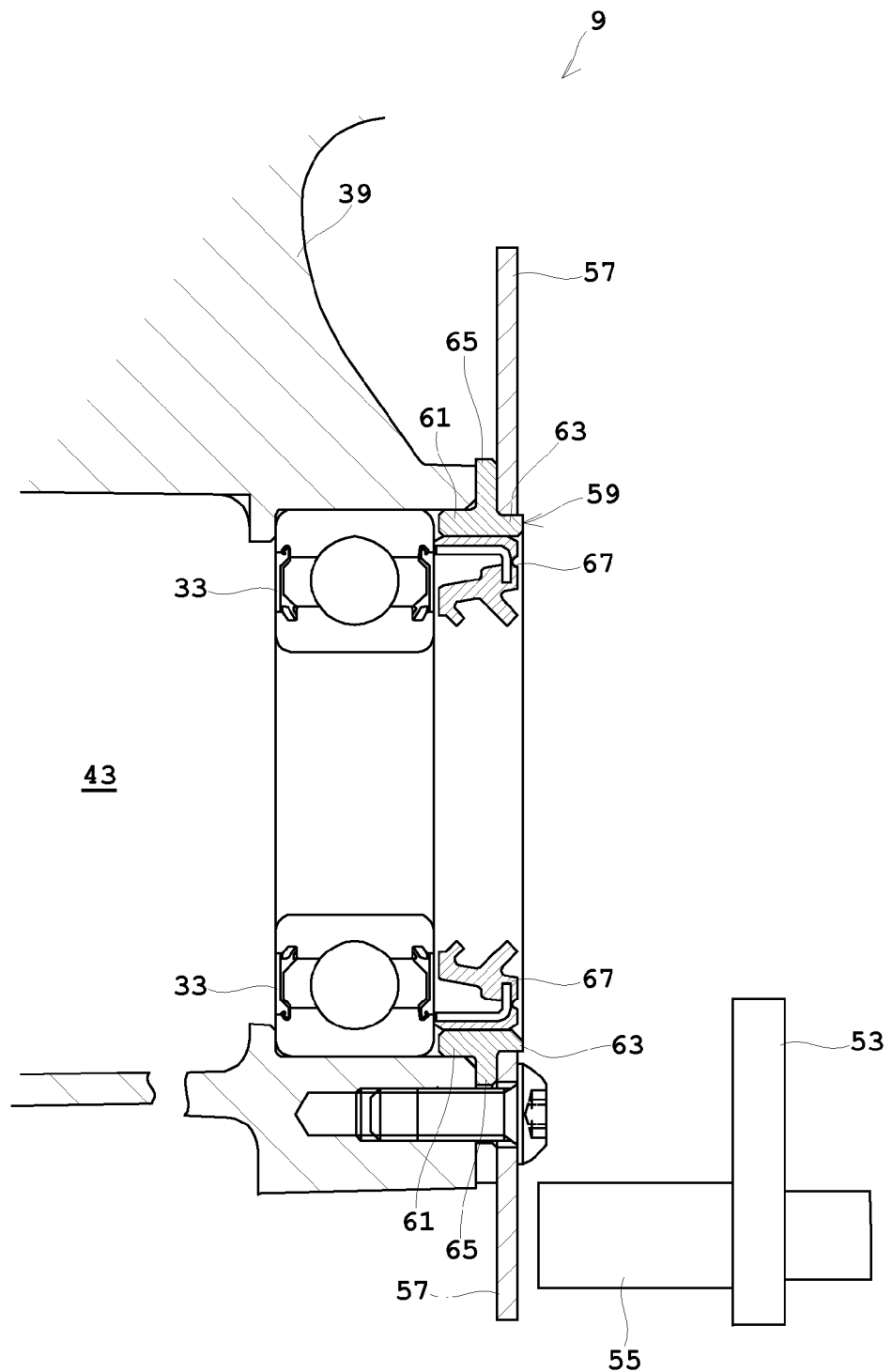
FIG. 4 is a view in vertical section taken in a transverse direction of a sensor rotor.

Next, the front wheel and its associated components will be described with reference to FIGS. 2-4. FIG. 2 is an enlarged side view of a portion around the center of the front wheel. FIG. 3 is a view in vertical section taken in a transverse direction passing through a hub of the front wheel. FIG. 4 is a view in vertical section taken in a transverse direction of a sensor rotor.

The front wheel 9 includes a wheel member 31, bearings 33 and a tire 35. The wheel member 31 is formed of a magnesium alloy, for example, and has a rim 37, a hub 39 and a plurality of spokes 41. The rim 37, which is annular in shape, and the hub 39 is formed centrally thereof and has a through hole 43 formed to extend through its center in the transverse direction. The spokes 41 connect inner peripheries of the rim 37 and outer peripheries of the hub 39. Of right and left end regions of an inner circumferential surface of the through hole 43, ranges from portions where the bearings 33 are mounted to opening locations have been processed to have a highly accurate coaxiality with respect to the center of rotation (for instance the center of rotation of the front wheel 9), since it is necessary to ensure a high degree of rotation accuracy of the front wheel 9.

The wheel member 31 has disk plates 45 attached to opposite sides in the transverse direction thereof. The disk plates 45 are annular in shape, and are fixed in positions close to its inner circumference to the hub 39 by screws. The front forks 7 have an axle bracket 47 provided at each lower end thereof, and a caliper stay 49 is attached to an upper part of the axle bracket 47. The caliper stay 49 has one end thereof attached to one of the front forks 7, and a brake caliper body 51 is attached to the other end of the caliper stay 49. Brake caliper bodies 51 press against the disk plates 45 from opposite sides to apply braking action. The left one of the front forks 7 has a sensor stay 53 mounted between caliper stay 49 and axle bracket 47. One end of the sensor stay 53 is attached to the front fork 7, and a wheel speed sensor 55 is attached to the other end of the sensor stay 53.

A sensor rotor 57 is mounted in a position closer to the center of the hub 39 than the inner circumference of the disk plate 45. The sensor rotor 57 is formed of iron, for example, and has an outside diameter smaller than an inside diameter of the disk plate 45. The sensor rotor 57 is mounted on the hub 39 using the inner circumferential surface of the through hole 43 as reference. The sensor rotor 57 has a plurality of openings 57a formed therein. The wheel speed sensor 55 magnetically detects portions with the openings 57a and portions without, for example, and outputs a pulsed signal corresponding to a rotating speed of the sensor rotor 57 to an ECU (engine control unit) not shown. That is, the wheel speed sensor 55 may detect a change in magnetic field caused by a change in the openings 57a within a predetermined area. For instance, as the front wheel 9 rotates, a total area of the openings 57a (or a number of the openings 57a), disposed within the predetermined area changes. This change in area of the openings 57a may affect a magnetic field within the predetermined area. The change in the magnetic field within the predetermined area may be detected by the wheel speed sensor 55. The detected changes in the magnetic field may indicate a frequency of rotation of the front wheel 9. For example, a frequency in change of the magnetic field within the predetermined area may correspond to the frequency of rotation of the front wheel 9. The predetermined area may include less than all of the sensor rotor 57. Thus, the ECU derives a rotational frequency of the front wheel 9 from the signal received from the wheel speed sensor 55, for use as display on a speedometer and/or lock determination by an ABS (antilock brake system).

The sensor rotor 57 is mounted on the hub 39 through a spacer 59. The spacer 59 is formed of an aluminum alloy, for example. The spacer 59 has a projection 61, a mount portion 63 and a positioning portion 65. The projection 61 is formed to project from the spacer 59 toward the hub 39 and to have an outside diameter of an outer circumferential surface thereof corresponding to the inside diameter of the inner circumferential surface of the through hole 43 where the bearing 33 is fitted. This projection 61 is fitted in the inner circumferential surface of the through hole 43 to the left of the bearing 33. The mount portion 63 is formed to project from the spacer 59 away from the projection 61. The mount portion 63 has the sensor rotor 57 mounted thereon, with an inner circumferential surface of the sensor rotor 57 positionally adjusted to an outer circumferential surface of the mount portion 57. The positioning portion 65 is formed between the projection 61 and the mount portion 63, and extends radially of the wheel member 31. This positioning unit 65 contacts a left side surface of the hub 39 directed radially from the through hole 43 for positioning in the transverse direction.

The spacer 59 is mounted in the through hole 43 to have the projection 61 located on a left side surface of the bearing 33. The sensor rotor 57 is mounted on the mount portion 63, with its inner circumferential surface positionally adjusted to the outer circumferential surface of the mount portion 63, and is fixed in a plurality of positions to the hub 39 by screws. A dust seal 67 is fitted between the inner circumferential surface of the spacer 59 and an outer lateral surface of the bearing 33 for preventing entry of dust.

The front wheel 9 with the sensor rotors 57 attached as described above is placed between the front forks 7, in a state of opening centers of the through hole 43 and axle brackets 47 being in alignment. Next, the front wheel 9 is rotatably attached to the front forks 7 by inserting an axle 69 in the through hole 43, and fixing the axle 69 to the axle brackets 47 by screws.

According to this embodiment, the through hole 43 formed at the center of rotation of the hub 39 is such that, since it is necessary to ensure a high degree of rotation accuracy of the front wheel 9 by the bearings 33 and axle 69, the ranges of the through hole 43 from the portions where the bearings 33 are mounted to the opening locations have been processed to have a highly accurate coaxiality with respect to the center of rotation. Therefore, by mounting the sensor rotor 57 using the inner circumferential surface of this through hole 43 as reference, the sensor rotor 57 can be mounted with a high degree of coaxiality without processing the outer circumferential surface of the hub 39. This can curb processing cost to reduce the cost of the front wheel 9. Since the reference for mounting the sensor rotor 57 can be set close to the center of rotation, the sensor rotor 57 can be reduced in diameter. This can attain a weight saving of the front wheel 9. Since the diameter of the sensor rotor 57 can be small, the sensor stay 53 to which the wheel speed sensor 55 is attached can be reduced in length and improved in strength.

The projection 61 of the spacer 59 is mounted in the through hole 43, and the sensor rotor 57 is mounted on the mount portion 63 of the spacer 59, which can realize the high degree of coaxiality with ease. Where, as in Embodiment 1, the wheel member 31 is formed of a magnesium alloy and the sensor rotor 57 iron, the sensor rotor 57 cannot be directly attached to the wheel member 31 because of electric corrosion. However, by interposing the spacer 59 formed of a different material from the sensor rotor 57 and wheel member 31, such an inconvenience is avoided, and at the same time these components can be attached with high coaxiality.

The dust seal 67 provided between bearing 33 and spacer 59 can prevent entry of dust to the bearing 33. Therefore, performance can be maintained over a long period of time.

<Embodiment 2>

Next, Embodiment 2 of this invention will be described with reference to the drawings.

Figure 5:
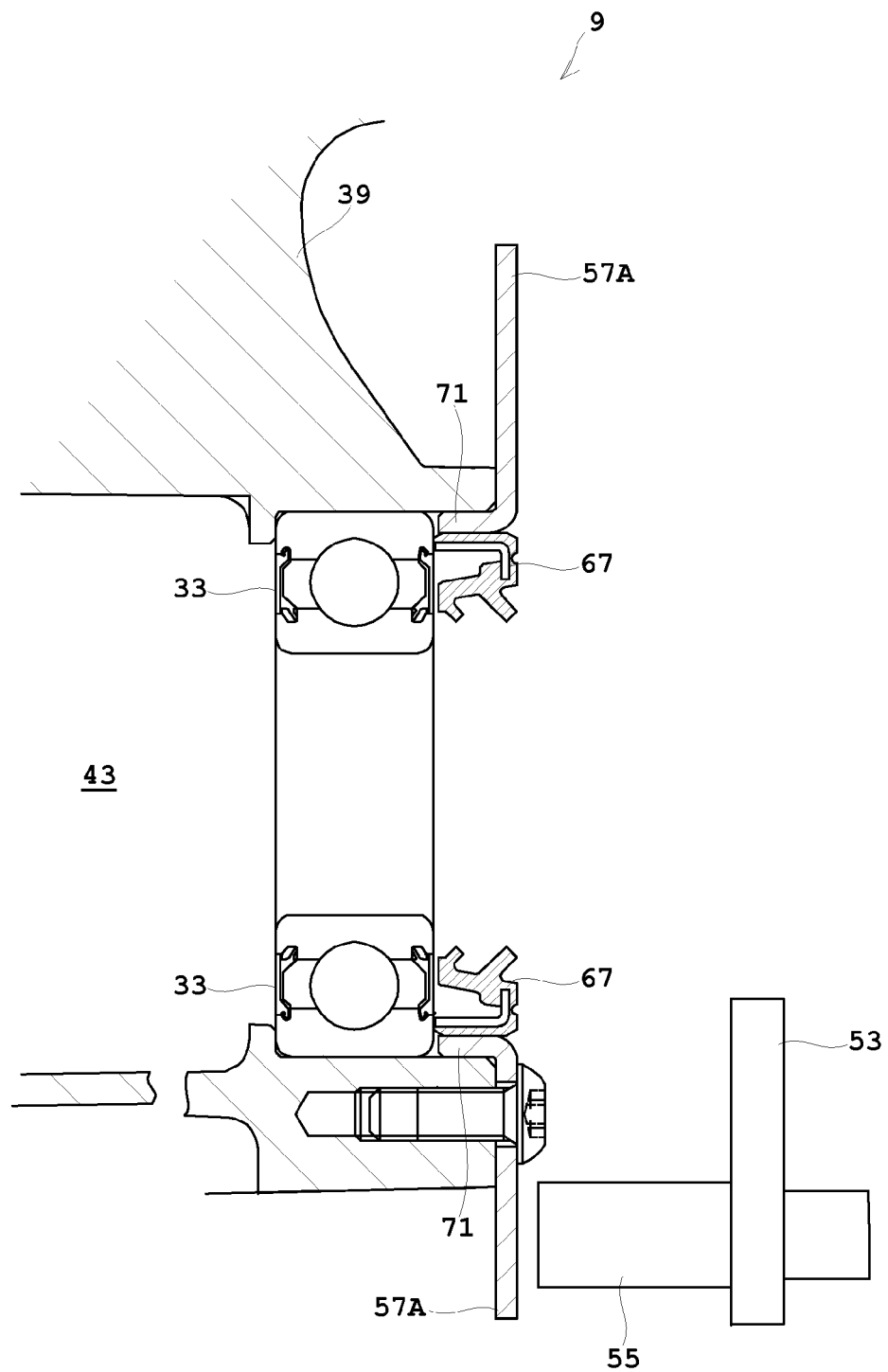
FIG. 5 is a view in vertical section taken in a transverse direction of a sensor rotor according to Embodiment 2.

FIG. 5 is a view in vertical section taken in a transverse direction of a sensor rotor according to Embodiment 2.

This embodiment provides only what is different from the construction of sensor rotor 57 in Embodiment 1 described above. Therefore, like components are affixed with like reference signs and will not particularly be described again.

As distinct from Embodiment 1 described above, a sensor rotor 57A in this embodiment does not have the spacer 59. The sensor rotor 57A is directly attached to the wheel member 31. The sensor rotor 57A in this embodiment is formed of iron, and the wheel member 31 is formed of an aluminum alloy, for example. The sensor rotor 57A can therefore be directly attached to the wheel member 31 with no problem.

The sensor rotor 57A has an engaging portion 71. The engaging portion 71 is formed of an inner circumferential region of the sensor rotor 57A projecting toward the hub 39. The engaging portion 71 has an outer circumferential surface with an outside diameter corresponding to the inside diameter of the inner circumferential surface of the through hole 43 where the bearing 33 is fitted. The sensor rotor 57A is mounted with the outer circumferential surface of the engaging portion 71 located on the inner circumferential surface of the through hole 43, and is fixed in a plurality of positions to the hub 39 by screws. A dust seal 67 is fitted between the inner circumferential surface of the engaging portion 71 and the outer lateral surface of the bearing 33 for preventing entry of dust.

According to this embodiment, the sensor rotor 57A does not need an interposing component such as the spacer 59. The sensor rotor 57A can be mounted easily with a high degree of coaxiality.

This invention is not limited to the foregoing embodiments, but may be modified as follows:

(1) Foregoing Embodiment 1 has been described taking for example the case where the wheel member 31 is formed of a magnesium alloy, the sensor rotor 57 iron, and the spacer 59 an aluminum alloy. In foregoing Embodiment 2, the wheel member 31 is formed of an aluminum alloy, and the sensor rotor 57A iron. However, this invention not limited to these materials for forming the respective components.

(2) In each of foregoing Embodiments 1 and 2, the spacer 59 is included, or the inner circumferential shape of the sensor rotor 57A is processed, in order to mount the sensor rotor 57 or 57A on the hub 39 using the inner circumferential surface of the through hole 43 as reference. However, this invention is not limited to these constructions. For example, the inside diameter of the sensor rotor and the inside diameter in the end region of the through hole 43 may be made the same, and the sensor rotor may be mounted and positionally adjusted in a state where a rod-like jig having an outside diameter corresponding to the inside diameter of the through hole 43 is inserted in the through hole 43. Then, the sensor rotor may be fixed to the hub 39 with screws, followed by removal of the jig.

(3) Each of foregoing Embodiments 1 and 2 has been described taking for example the case of the front wheel 9 provided with the sensor rotor 57 or 57A. This invention is applicable also to the rear wheel 17.

(4) In each of foregoing Embodiments 1 and 2, the sensor rotor 57 or 57A is provided on the left side of the front wheel 9. Instead, the sensor rotor 57 or 57A may be provided on the right side of the front wheel 9.

(5) In each of foregoing Embodiments 1 and 2, the wheel member 31 has disk plates 45 disposed at the opposite sides in the transverse direction thereof. This invention is not limited to such an arrangement. For example, this invention is applicable also where a disk plate 45 is provided at only one side in the transverse direction.

(6) Each of Embodiments 1 and 2 has been described taking the two-wheeled motor vehicle 1 as an example of saddle riding type vehicle. However, this invention is applicable also to other saddle riding type vehicles. The other saddle riding type vehicles include, for example, a scooter, a two-wheeled motor vehicle other than the scooter type, such as a moped, a three-wheeled motor vehicle, a four-wheeled motor vehicle, and an ATV (All Terrain Vehicle) four-wheeled buggy.

This invention may be embodied in other specific forms without departing from the spirit or essential attributes thereof and, accordingly, reference should be made to the appended claims, rather than to the foregoing specification, as indicating the scope of the invention.

What is claimed is:

1. A saddle riding type vehicle driven by a straddling rider, comprising:
    a wheel including
        a wheel member having
            an annular rim, and
            a hub formed centrally of the rim to have a through hole formed at a center of rotation of the hub,
        a bearing attached to an inner circumferential surface that defines the through hole, and
        a tire attached to the rim;
    an axle inserted in the through hole;
        a wheel support for rotatably supporting the wheel with the axle;
    a sensor rotor mounted on the hub using the inner circumferential surface that defines the through hole as a reference;
    a wheel speed sensor for detecting rotation of the sensor rotor; and
    a spacer including a projection projecting from a part of the spacer toward the hub, and a mount portion projecting from the part of the spacer in a direction away from the projection, the spacer being attached with an outer circumferential surface of the projection positionally adjusted to the inner circumferential surface that defines the through hole;
    wherein the sensor rotor has an annular shape projecting outward, and is mounted with an inner circumferential surface thereof positionally adjusted to an outer circumferential surface of the mount portion.

2. The saddle riding type vehicle according to claim 1, further comprising a dust seal in the through hole and disposed between an inner circumferential surface of the spacer and an outer lateral surface of the bearing.

3. The saddle riding type vehicle according to claim 2, wherein the wheel member is formed of a magnesium alloy, the sensor rotor is formed of iron, and the spacer is formed of an aluminum alloy.

4. The saddle riding type vehicle according to claim 3, wherein the sensor rotor has a plurality of openings formed therein.

5. The saddle riding type vehicle according to claim 4, wherein the wheel speed sensor is arranged to magnetically detect a presence or an absence of the openings within a predefined area.

6. The saddle riding type vehicle according to claim 2, wherein the sensor rotor has a plurality of openings formed therein.

7. The saddle riding type vehicle according to claim 6, wherein the wheel speed sensor is arranged to magnetically detect a presence or an absence of the openings within a predefined area.

8. The saddle riding type vehicle according to claim 1, wherein the wheel member is formed of a magnesium alloy, the sensor rotor is formed of iron, and the spacer is formed of an aluminum alloy.

9. The saddle riding type vehicle according to claim 8, wherein the sensor rotor has a plurality of openings formed therein.

10. The saddle riding type vehicle according to claim 9, wherein the wheel speed sensor is arranged to magnetically detect a presence or an absence of the openings within a predefined area.

11. The saddle riding type vehicle according to claim 1, wherein the sensor rotor has a plurality of openings formed therein.

12. The saddle riding type vehicle according to claim 8, wherein the wheel speed sensor is arranged to magnetically detect a presence or an absence of the openings within a predefined area.

13. A saddle riding type vehicle driven by a rider, comprising:
    a wheel including
        a wheel member having
            an annular rim, and
            a hub formed proximate the rim to have a through hole formed at a center of rotation of the hub,
        a bearing attached to an inner circumferential surface that defines the through hole, and
        a tire attached to the rim;
    an axle inserted in the through hole;
        a wheel support for rotatably supporting the wheel via the axle;
    a sensor rotor mounted on the hub to be coaxial with the center of rotation and at a predetermined position with respect to the through hole;
    a wheel speed sensor for detecting rotation of the sensor rotor; and
    a spacer including a projection projecting from a part of the spacer toward the hub, and a mount portion projecting from the part of the spacer in a direction away from the projection, the spacer being attached with an outer circumferential surface of the projection positionally adjusted to the inner circumferential surface that defines the through hole;
    wherein the sensor rotor has an annular shape projecting outward, and is mounted with an inner circumferential surface thereof positionally adjusted to an outer circumferential surface of the mount portion.

* * * * *